US011025741B2

(12) United States Patent
Appel et al.

(10) Patent No.: US 11,025,741 B2
(45) Date of Patent: Jun. 1, 2021

(54) DYNAMIC COGNITIVE USER INTERFACE

(71) Applicant: International Business Machines Corporation, Armonk, NY (US)

(72) Inventors: Ana Paula Appel, São Paulo (BR); Heloisa Caroline de Souza Pereira Candello, São Paulo (BR); Vagner Figueredo de Santana, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 15/164,345

(22) Filed: May 25, 2016

(65) Prior Publication Data
US 2017/0344645 A1    Nov. 30, 2017

(51) Int. Cl.
H04L 29/08      (2006.01)
G06Q 50/00      (2012.01)
H04W 4/21       (2018.01)
H04W 4/38       (2018.01)
G06F 16/332     (2019.01)
G06F 16/9535    (2019.01)

(52) U.S. Cl.
CPC ........ H04L 67/306 (2013.01); G06F 16/3329 (2019.01); G06F 16/9535 (2019.01); G06Q 50/01 (2013.01); H04W 4/21 (2018.02); H04W 4/38 (2018.02)

(58) Field of Classification Search
CPC .................................................. G06F 16/9535
See application file for complete search history.

(56) References Cited

U.S. PATENT DOCUMENTS 5,442,780 A      8/1995  Takanashi
6,874,127 B2 *   3/2005  Newell ................... G06F 1/163
                                                        706/14
6,876,906 B1     4/2005  Zellers et al.
7,492,305 B1     2/2009  Woodell et al.
(Continued)

FOREIGN PATENT DOCUMENTS

WO      0233541 A2       4/2002
WO   2010004585 A2       1/2010
WO   2011053112 A1       5/2011

OTHER PUBLICATIONS

Olston, Mackinlay; "Visualizing data with bounded uncertainty"; Information Visualization, 2002, INFOVIS; IEEE Symposium, 2002; 4 pages.
(Continued)

Primary Examiner — Charles E Lu
(74) Attorney, Agent, or Firm — Aaron N. Pontikos; William H. Hartwell

(57) ABSTRACT

A system, method and program product for a query-based interface in a cognitive computing platform. A system is provided that includes a query processor that inputs a query for an identified user and determines a set of results for inclusion in a cognitive response based on a set of information sources; a modality selection system that selects an interface modality for the cognitive response based on user profile data and at least one external input; and a response formatting system that determines a response format for the set of results in the cognitive response, wherein the response format is determined based on confidence levels determined from social networking information associated with the identified user.

14 Claims, 3 Drawing Sheets

(56) References Cited

U.S. PATENT DOCUMENTS

| | | | |
|---|---|---|---|
| 7,571,148 | B2 | 8/2009 | Siegel et al. |
| 7,962,326 | B2 | 6/2011 | Tsourikov |
| 8,005,870 | B1 | 8/2011 | Bedell |
| 8,244,466 | B2 | 8/2012 | DeJonge et al. |
| 8,547,223 | B2 | 10/2013 | Midtun et al. |
| 8,584,046 | B2 | 11/2013 | Lee et al. |
| 8,681,178 | B1 | 3/2014 | Tseng |
| 9,848,036 | B1* | 12/2017 | Smus .................. H04L 67/10 |
| 2005/0215870 | A1* | 9/2005 | Rademaker ............ A61B 5/00 600/301 |
| 2006/0095457 | A1 | 5/2006 | Glasspool et al. |
| 2006/0206477 | A1 | 9/2006 | Dalvi |
| 2010/0312129 | A1 | 12/2010 | Schecter |
| 2011/0125702 | A1 | 5/2011 | Gorur Narayana Srinivasa |
| 2011/0270607 | A1 | 11/2011 | Zuev |
| 2011/0320423 | A1* | 12/2011 | Gemmell ................ G06F 7/00 707/706 |
| 2015/0119651 | A1* | 4/2015 | Grubis .................. A61B 5/024 600/301 |
| 2017/0048378 | A1* | 2/2017 | Rubinstein ............. H04L 51/02 |

OTHER PUBLICATIONS

Davis, Keller; "Modelling and Visualizing Multiple Spatial Uncertainties"; Computers & GeoSciences 23.4; 1997; 397-408; 12 pages.

Thomson et al; "A typology for Visualizing Uncertainty"; Electronic Imaging 2005; International Society for Optics and Photonics, 2005; 12 pages.

Maceachren et al. "Visualizing Geospatial Information Uncertainty: What we Need to Know and What We Need to Do"; Cartography and Geographic Information Science 32.3; 2005; 139-160; 22 pages.

Maceachren; "Visualizing Uncertain Information"; Cartographic Perspectives 13; 1992; 10-19; 10 pages.

Johnson, Sanderson; "A Next Step: Visualizing Errors and Uncertainty"; Computer Graphics and Applications, IEEE 23.5; 2003; 6-10, 5 pages.

Maceachren et al.; "Visual Semiotics and Uncertainty Visualization: An Empirical Study"; Visualization and Computer Graphics, IEEE Transactions on 18.12; 2012; 2496-2505; 10 pages.

Pappenberger et al.; "Visualizing Probalistic Flood Forecast Information: Expert Preferences and Perceptions of Best Practice in Uncertainty Communication"; Hydrological Processes 27.1; 2013; 132-146; 131 pages.

Kirschenbaum et al.; "Visualizing Uncertainty: The Impact on Performance"; Human Factors: The Journal of the Human Factors and Ergonomics Society; 2013; 12 pages.

Skeels, et al.; "Revealing Uncertainty for Information Visualization"; Information Visualization 9.1; 2010; 70-81; 13 pages.

Bisantz et al.; "Displaying Uncertainty: Investigating the Effects of Display Format and Specificity"; Human Factors: The Journal of the Human Factors and Ergonomics Society 47.4; 2005; 777-796; 20 pages.

Lodha et al; "Listen: Sounding Uncertainty Visualization"; Proceedings of the 7th Conference on Visualization, 1996; IEEE Computer Society Press, 1996; 8 pages.

Nahamoo, David, "Cognitive Computing Journey", PPAA'14, Feb. 16, 2014, Orlando, Florida, USA, p. 63, ACM 978-1-4503-2654-4/14/02, <http://dx.doi.org/10.1145/2567634.2567645>.

Hubbard, Douglas W., "How to Measure Anything: Finding the Value of "Intangibles" in Business", book description, 10 pages, John Wiley & Sons, 2007.

\* cited by examiner

DYNAMIC COGNITIVE USER INTERFACE

TECHNICAL FIELD

The subject matter of this invention relates to cognitive user interfaces, and more particularly to a query-based interface system that utilizes uncertainty to determine a look and feel of the cognitive output.

BACKGROUND

Cognitive computing systems include technology platforms that are generally based on the scientific disciplines of artificial intelligence and signal processing. These platforms may encompass machine learning, reasoning, natural language (NL) processing, speech and vision, human-computer interaction, dialogue and narrative generation and more. One particular application of cognitive computing involves query-based (i.e., question and answer based) processing in which a user submits a query and a probabilistic response is generated. Processing may for example include receiving natural language queries, analyzing the natural language query, identifying information sources, finding and generating hypotheses, finding and scoring evidence, merging and ranking hypotheses, and outputting a response.

While cognitive computing continues to gain traction in more and more mainstream applications, user interaction with cognitive computing systems has remained relatively static in nature. Current query-based systems generally receive queries and deliver responses according to some predefined interface structure, e.g., a keyed in NL query will result in a typed out NL response.

SUMMARY

Aspects of the disclosure provide a dynamic query-based interface system, in which the modality and response format (i.e., look and feel) of the interface is dynamically implemented based on various factors, such as user profile data, environmental data, sensory data, and uncertainty information determined from social networking information of an associated user.

A first aspect discloses query-based interface system for use with a cognitive computing platform, comprising: a query processor that inputs a query for an identified user and collects a set of results for inclusion in a cognitive response based on a set of information sources; a modality selection system that selects an interface modality for the cognitive response based on user profile data and at least one external input; and a response formatting system that determines a response format for the set of results in the cognitive response, wherein the response format is determined based on confidence levels determined from social networking information associated with the identified user.

A second aspect discloses a computer program product stored on a computer readable storage medium, which when executed by a computing system, provides a query-based interface for a cognitive computing platform, the program product comprising: program code that inputs a query for an identified user and collects a set of results for inclusion in a cognitive response based on a set of information sources; program code that selects an interface modality for the cognitive response based on user profile data and at least one external input; and program code that determines a response format for the set of results in the cognitive response, wherein the response format is determined based on confidence levels determined from social networking information associated with the identified user.

A third aspect discloses a computerized method for implementing a query-based interface for a cognitive computing platform, the method comprising: inputting a query for an identified user; collecting a set of results for inclusion in a cognitive response based on a set of information sources; selecting an interface modality for the cognitive response based on user profile data and at least one external input; and determining a response format for the set of results in the cognitive response, wherein the response format is determined based on confidence levels determined from social networking information associated with the identified user.

BRIEF DESCRIPTION OF THE DRAWINGS

These and other features of this invention will be more readily understood from the following detailed description of the various aspects of the invention taken in conjunction with the accompanying drawings in which.

Figure 1:
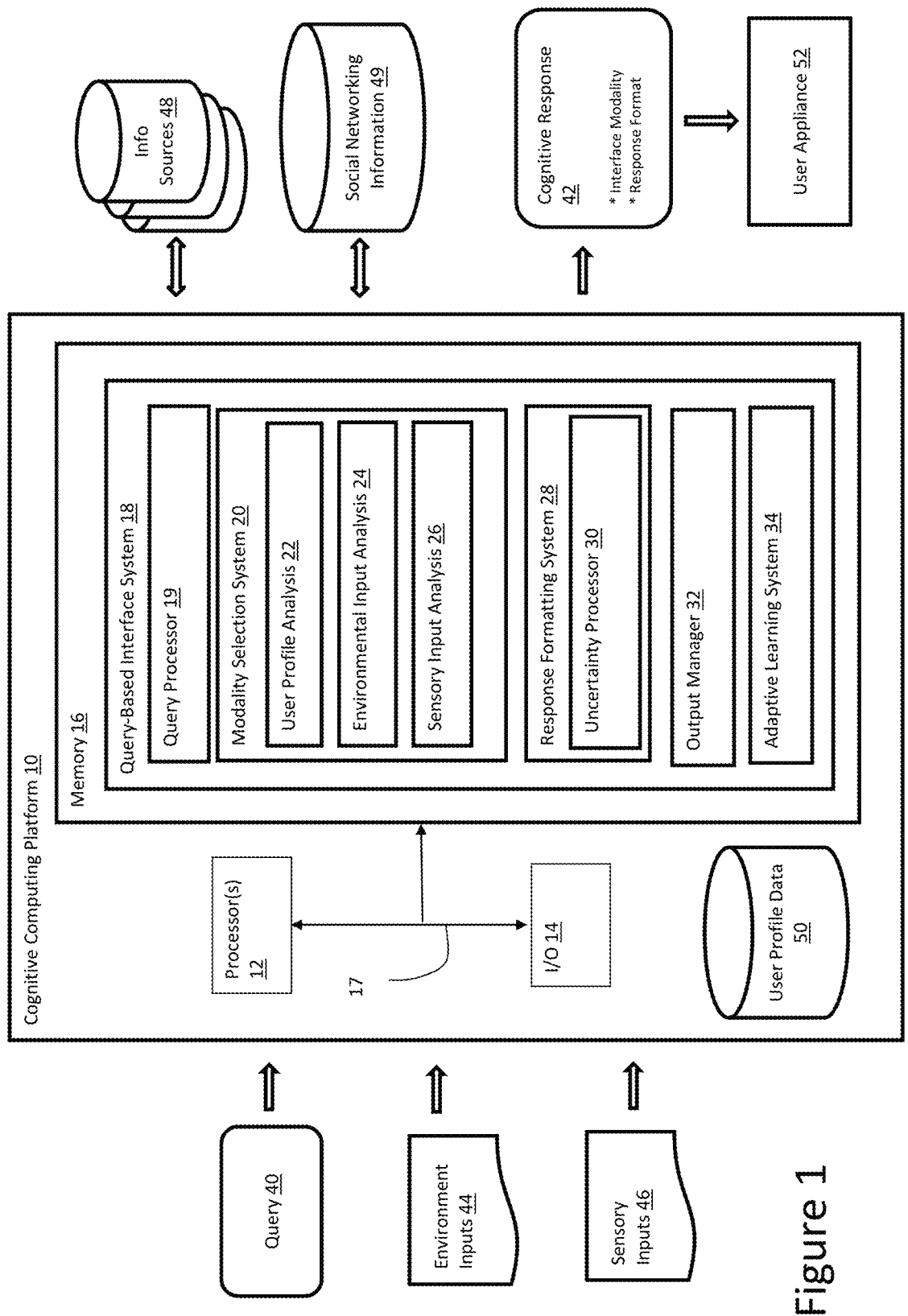
FIG. 1 shows a cognitive computing system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a cognitive computing system 10 having a query-based interface system ("interface system") 18 that inputs a query 40 from (or on behalf of) a user and outputs a dynamically configured cognitive response 42. In particular, cognitive response 42 includes a selected interface modality (e.g., audio, visual, tactile, etc.) and format (color, volume, pattern, frequency, blinking rate, etc.) that are determined and configured on a query-by-query basis. Further, the format of the cognitive response 42 is based on a confidence level of the results in the cognitive response 42, which is based on social networking information 49 of an associated user. For example, a highly confident cognitive response 42 for a particular user may be shown in green, while a less certain response may be shown in red.

Interface system 18 generally includes: a query processor 19 that receives the inputted query 40 and performs or initiates a cognitive process to determine a set of (one or more) results for the query 40 from a set of information sources 48; a modality selection system 20 that selects an interface modality for the cognitive response 42; a response formatting system that evaluates the set of results to determine confidence levels based on an analysis of social networking information 49 associated with the user; an output manager 32 that structures and outputs the cognitive response 42 for a user appliance 52; and an adaptive learning system 34 that captures the efficacy of the cognitive response 42 for future use.

Query processor 19 may use or interface with any type of cognitive processing system for collecting a set of results. The set may for example include a ranked list of answers to a query 40, or may include a single result. For example, the user may submit the query 40, "please show me the best nearby places to eat lunch." Once the query 40 is parsed and disambiguated, information sources 48 comprising search websites, such as YELP® or TRIPADVISOR® may be evaluated to return a ranked list of nearby restaurants. In another example, a user may enter the query 40, "please tell me how much money I have in my checking account and transfer the balance to the following account." In this case, query processor would interrogate the user's bank account, extract the necessary information and generate a result that might for example require verification before effectuating the transfer. In still another case, query processor 19 may receive a query 40 requesting an appropriate song list for a user performing a workout program on a treadmill. In this case, the query processor 19 may interrogate music apps used by user and identify a list of relevant songs.

Modality selection system 20 selects an interface modality for the cognitive response 42 based on user profile data 50 and at least one external input which may include environmental inputs 44 and sensory inputs 46. Any number or type of modalities may be employed, e.g., audio, audio/visual, visual, textual, tactile, secure, private, etc. Further, each modality type may have different subcategories, e.g., different voice types/intonation, different tactile outputs, different messaging programs, different interface protocols such as HTML or mobile HTML, etc.

Environmental inputs 44 may for example include surrounding noise levels, weather conditions, time of day, location, speed, etc. For example, if the user is in a noisy bar or restaurant, it may be more appropriate to output the cognitive response 42 in the form of a text message versus an audio output. Still in other cases, e.g., if the user is driving, it may be more appropriate to output a tactile/aural response versus a text message. An environmental input analysis 24 may be utilized and include any algorithm or procedure for analyzing environment inputs 44 and scoring potential interface modalities. For instance, based on environmental factors associated with the user, possible modality scores may be determined as:

Environmental_Modality (audio.1)=8
Environmental_Modality (audio.2)=7
Environmental_Modality (text)=5
Environmental_Modality (tactile.1)=2
Environmental_Modality (tactile.2)=1

Sensory inputs 46 generally include bio-sensor and physiological data collected from the user. For example, if the user is breathing heavily and has a high heartbeat, it may be deduced that the user is working out, so a visual output of a cognitive response 42 may be preferred. In another example, if the user is nervous and is asking for banking data, then a private or highly secure modality output may be warranted. A sensory input analysis 26 may be utilized to include any algorithm or procedure for analyzing sensory inputs 46 and further scoring potential interface modalities. For example, current sensory inputs associated with a user might result in the following scoring:

Sensory_Modality (audio.1)=5
Sensory_Modality (audio.2)=8
Sensory_Modality (text)=3
Sensory_Modality (tactile.1)=2
Sensory_Modality (tactile.2)=1

User profile data 50 may include user preferences for interface modalities for different types of queries 40 or input scenarios. For example, the user may set preferences that cognitive responses 42 involving travel queries should be displayed in an HTML format, cognitive responses 42 involving generic web searches should be broadcast back in an audio format, etc. User profile analysis 22 may consider both preferences set by the user and preferences determined from adaptive learning system 34 (i.e., based on feedback from prior cognitive responses 42). Any algorithm or procedure for analyzing user profile data 50 and further scoring potential interface modalities may be utilized. For example a user may have set the following preferences for a particular type of query:

Profile_Modality (audio.1)=10
Profile_Modality (audio.2)=5
Profile_Modality (text)=8
Profile_Modality (tactile.1)=5
Profile_Modality (tactile.2)=0

The overall modality selection may in one embodiment be based on a rules engine that considers each of the user profile analysis 22 (e.g., the user prefers text messages); environmental input analysis 24 (e.g., the user is driving so audio output should be used and a confirmation text can be sent later); and sensory input analysis 26 (the user is angry so a calming voice should be used). In another approach, the modality selection may simply use the modality with the highest composite score.

In addition to determining the appropriate interface modality for a cognitive response 42, response formatting system 28 further determines the format of the set of results within the cognitive response 42 using uncertainty processor 30. Uncertainty processor 30 attaches an uncertainly or confidence level to the set of results, based for example on user's determined interactions or connections with social networking information 49. Interactions may include behaviors (e.g., past ratings, posts, likes, reviews, etc.) made by social media friends, followers, cohorts, etc. Connections may include, e.g., graph analysis, clustering, etc., that match a user with relevant behavior patterns. For example, a user profile may be matched to a cluster of other users that like/dislike, trust/distrust, use/do not use, buy/do not buy, etc., goods, services and information related to the set of results generated by query processor 19.

For example, if one or more social networking friends of the user are known to frequent a restaurant listed in the set of results to a query 40 regarding lunch locales, then that restaurant may be assigned a high confidence (or low uncertainty) score. Restaurants that have no social networking connection to the user may conversely have a high uncertainty/low confidence score.

Similarly, if members of the user's social network subscribe to certain financial newsletters, then results generated in response to financial market queries 40 that reference the financial newsletters may have high confidence scores. Conversely, results that have no social networking connection to the user's network will have a low confidence score.

Regardless, once a confidence score is assigned to each result, the result(s) are formatted in way to connote the confidence (or uncertainty) within the selected modality by response formatting system 28. For example, where a visual modality is selected, results having a high confidence score may be colored green whereas results with low confidence may be colored yellow or red. In other cases, where a tactile modality is selected, a result with a high confidence score may utilize a more prominent vibration scheme than a result with a low confidence score. In a further case where an audio modality is selected, a result with a high confidence score may utilize a louder cognitive response 42 (e.g., a highly confident selected song to be played during a workout may be played at a maximum volume). In still a further case where a private or secure visual modality is required, the cognitive response 42 may be formatted with a low confidence setting to only display or allow access to a limited set of information (e.g., does not allow displaying funds information when the request comes from an unusual location while the user is being sensed as nervous).

Once the modality is selected and set of results are assigned a confidence level, output manager 32 structures and outputs cognitive response 42 for a user appliance 52. User appliance 52 may include any type of device or system through which the user can interact with the cognitive computing system 10, e.g., a smartphone, tablet, webpage, software client, Internet of things device, autonomous car, etc. It is also noted that once an interface modality is determined for a query 40, subsequent related queries 40 and cognitive responses 42 may default to the selected interface modality for a period of time. Furthermore, adaptive learning system 34 may utilize feedback from the user appliance 52 regarding the efficacy of the selected interface modality and response format. For instance, if the user immediately demanded a different modality or format after receiving the cognitive response 42, then that would result in a "negative" indication, which can be stored with user profile data 50 for future consideration.

Figure 2:
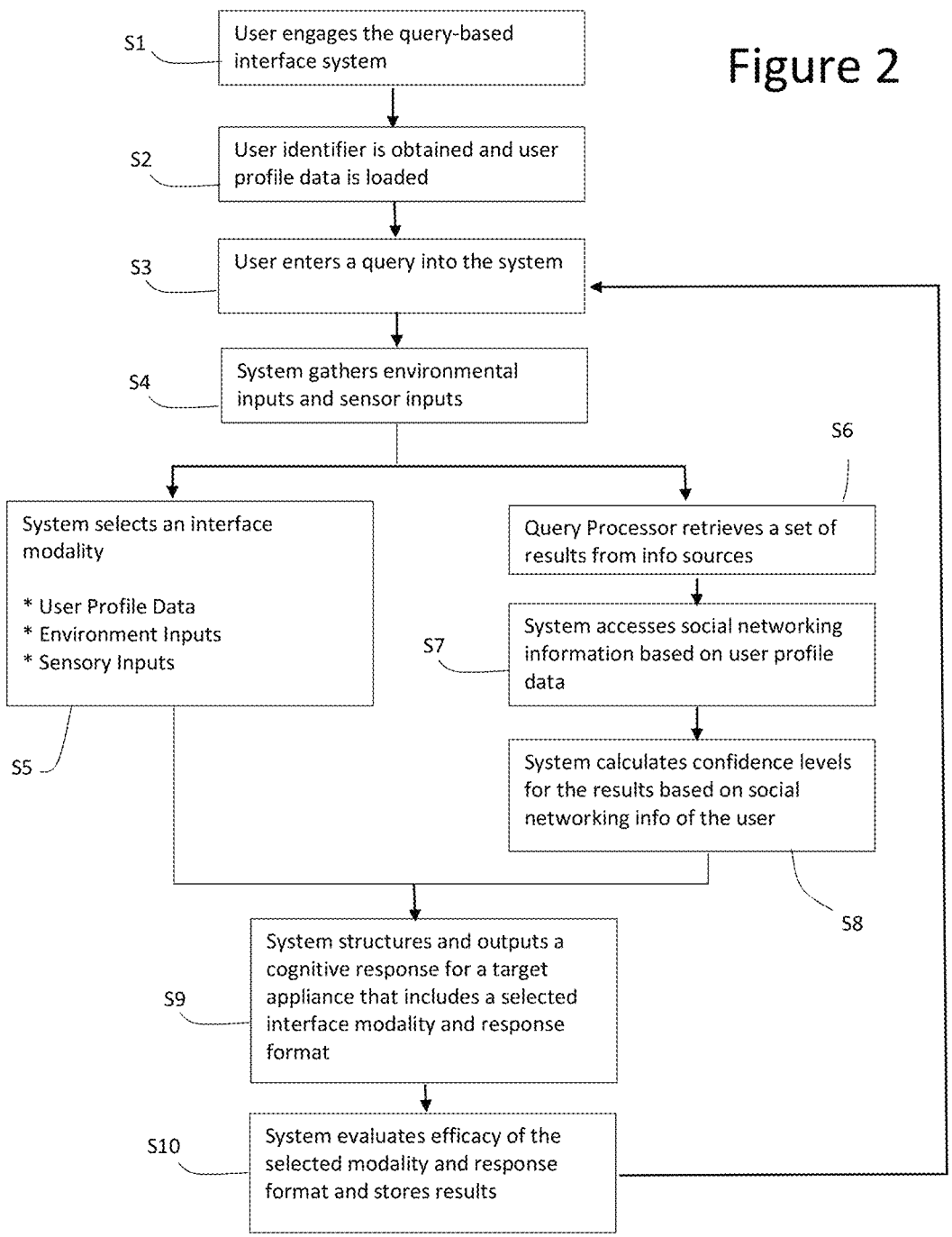
FIG. 2 shows a flow diagram of a query-based interface process according to embodiments.

FIG. 2 depicts a flow chart for implementing a query-based interface process of FIG. 1. At S1, the user engages the interface system 18, e.g., by logging in, launching an app, visiting a webpage, etc., and at S2 a user identifier is obtained and user profile data 50 is loaded. The user identifier may for example be determined from a login name, cookie, etc. User profile data 50 may comprise any information collected for the user, e.g., modality preferences, response format preferences, social networking preferences, accounts, preferred information sources, demographics, etc.

Next, at S3 the user enters a query 40. The query may comprise an NL input, a dropdown selection, a device generated input (e.g., a query from a piece of exercise equipment, autonomous car, Internet of things device, etc., on behalf of a user), etc. At S4, the interface system 18 gathers environmental inputs 44 and sensor inputs 46 such as location, speed, noise levels, weather, time of day, physiological information, heartrate, breathing, etc. At S5, an interface modality is selected that factors in at least one of user profile data, environmental inputs and sensory inputs. In parallel, the query processor 19 collects a set of results at S6 from information sources 49, such as websites, search engines, structured and unstructured data sources, etc. At S7, social networking information 49 (e.g., accounts, friends, followers, subscriptions, behaviors, patterns, etc.) is accessed based on the user profile data 50 and at S8, confidence levels are calculated for the results based on social networking information 49 of the user. For example, if a given result from a search of best hotels was rated as high by a person in the user's social network, a high confidence (low uncertainty) can be assigned to the result.

At S9, a cognitive response 42 is structured and outputted to a user appliance 52, which includes a selected interface modality and a response format in which the response format is based on the confidence level of each outputted result. The structure of the response 42 may depend on the type of user appliance 52 being employed. At S10, the efficacy of the selected interface modality and response format are evaluated, e.g., based on explicit or implicit feedback, and the results are stored for future use by the interface system 18. At this juncture, the user can submit a further query at S3 and the process is repeated.

Figure 3:
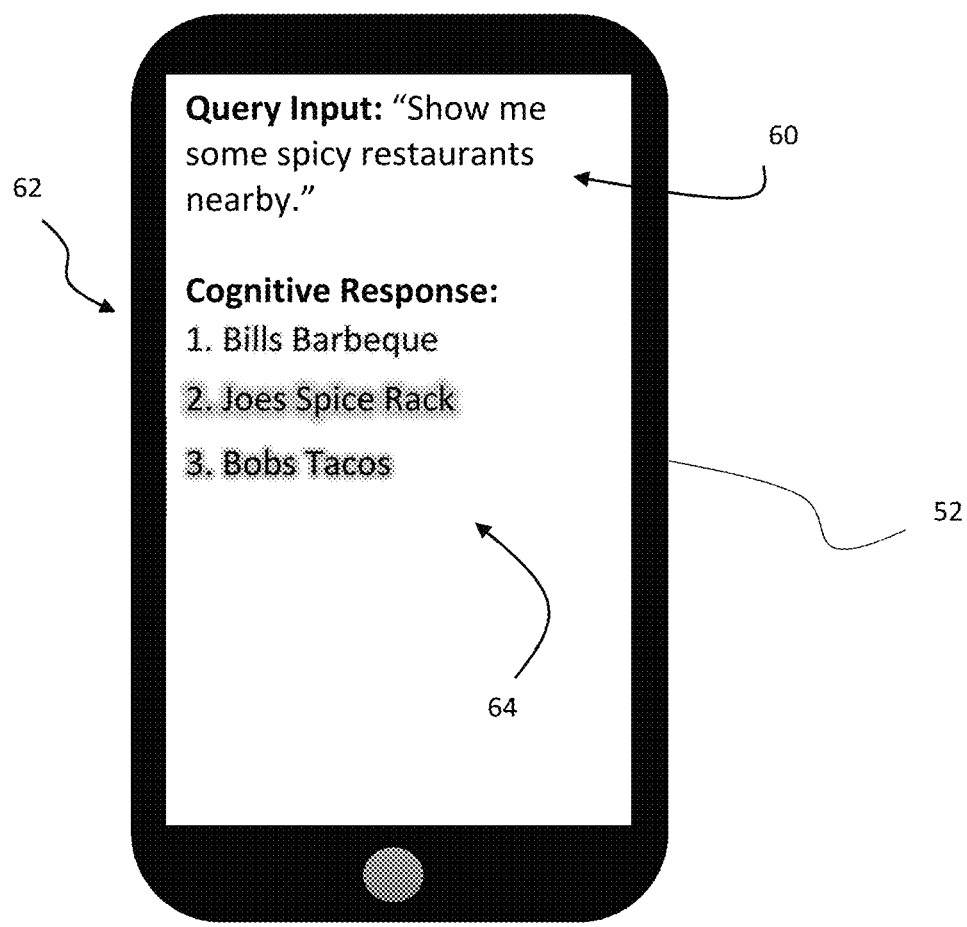
FIG. 3 shows an illustrative cognitive response on a target appliance according to embodiments.

FIG. 3 depicts an illustrative user appliance 52, in this case a smartphone that provides an app for interacting with query-based interface system 18. In this example, the user has submitted the query 60 "show me some spicy restaurants nearby." In accordance with the system and method described herein, a resulting cognitive response 62 may be generated that includes a ranked list of results. In this case, the results are formatted to connote confidence levels using shadowed text. More particularly, the higher the confidence level, the more shadowing that is used. Thus, in this case, Joes Spice Rack 64, although ranked second, has the highest confidence level. Alternatively, although ranked first, Bills Barbeque has the highest uncertainty since it has no shadowing over the text. Note that in this example, the response format used to indicate a confidence level correlates to the query—namely the shadowed text is use to connote flames and spiciness, which was part of the user query 60. Accordingly, the response format used to connote confidence may be determined based on information extracted from the query 40.

It is understood that query-based interface system 18 (FIG. 1) may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring again to FIG. 1, cognitive computing platform 10 may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing platform 10 may also be implemented in a distributed manner such that different components reside in different physical locations.

Furthermore, it is understood that the query-based interface system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A query-based interface system for use with a cognitive computing platform, comprising:
    a processor;
    a memory connected to the processor, the memory storing:
    a query processor that inputs a query for an identified user, collects a set of results for inclusion in a cognitive response based on a set of information sources, and gathers information from an environmental input and a sensory input, wherein the information includes a surrounding noise level, a weather condition, a time of day, a location, a speed, and physiological data of the identified user;
    a modality selection system that selects an interface modality for the cognitive response based on user profile data, the environmental input, and the sensory input, wherein selecting the interface modality includes performing input analysis on the environmental input and the sensory input, and generating a weighted modality score for one or more potential interface modalities, based, at least in part, on the environmental input, the sensory input, and the user profile data, wherein the user profile data includes preferences for the one or more potential interface modalities relative to the query; and a response formatting system that determines a response format for the set of results in the cognitive response, wherein the response format is determined based on confidence levels determined from social networking information associated with the identified user, and wherein the set of results is formatted to connote the confidence levels in the interface modality utilizing a vibration scheme on a device of the identified user and wherein the social networking information includes one or more clusters matching a user to a relevant behavior pattern based, at least in part, on behaviors of one or more social media connections.

2. The query-based interface system of claim 1, wherein the query processor inputs natural language (NL).

3. The query-based interface system of claim 1, wherein the set of information sources are selected from a group consisting of websites, search engines, structured data and unstructured data.

4. The query-based interface system of claim 1, wherein the interface modality is selected from a group consisting of: audio, audio/visual, tactile, textual, visual, secure, and private.

5. The query-based interface system of claim 1, wherein the response format is selected from a group consisting of: color patterns, size, audio output levels, blinking patterns, privacy settings, security settings, and graphics.

6. A computer program product stored on a computer readable storage medium, which when executed by a computing system, provides a query-based interface for a cognitive computing platform, the program product comprising:

program code that inputs a query for an identified user, collects a set of results for inclusion in a cognitive response based on a set of information sources, and gathers information from an environmental input and a sensory input, wherein the information includes a surrounding noise level, a weather condition, a time of day, a location, a speed, and physiological data of the identified user;

program code that selects an interface modality for the cognitive response based on user profile data, the environmental input, and the sensory input, wherein selecting the interface modality includes performing input analysis on the environmental input and the sensory input, and generating a weighted modality score for one or more potential interface modalities, based, at least in part, on the environmental input, the sensory input, and the user profile data, wherein the user profile data includes preferences for the one or more potential interface modalities relative to the query; and program code that determines a response format for the set of results in the cognitive response, wherein the response format is determined based on confidence levels determined from social networking information associated with the identified user, and wherein the set of results is formatted to connote the confidence levels in the interface modality utilizing a vibration scheme on a device of the identified user, and wherein the social networking information includes one or more clusters matching a user to a relevant behavior pattern based, at least in part, on behaviors of one or more social media connections.

7. The computer program product of claim 6, wherein the query includes natural language (NL).

8. The computer program product of claim 6, wherein the set of information sources are selected from a group consisting of websites, search engines, structured data and unstructured data.

9. The computer program product of claim 6, wherein the interface modality is selected from a group consisting of: audio, audio/visual, tactile, textual, visual, secure, and private.

10. The computer program product of claim 6, wherein the response format is selected from a group consisting of: color patterns, size, audio output levels, blinking patterns, privacy settings, security settings, and graphics.

11. A computerized method for implementing a query-based interface for a cognitive computing platform, the method comprising:

inputting a query for an identified user;

collecting a set of results for inclusion in a cognitive response based on a set of information sources;

gathering information from an environmental input and a sensory input, wherein the information includes a surrounding noise level, a weather condition, a time of day, a location, a speed, and physiological data of the identified user;

selecting an interface modality for the cognitive response based on user profile data, the environmental input, and the sensory input, wherein selecting the interface modality includes performing input analysis on the environmental input and the sensory input, and generating a weighted modality score for one or more potential interface modalities, based, at least in part, on the environmental input, the sensory input, and the user profile data, wherein the user profile data includes preferences for the one or more potential interface modalities relative to the query; and determining a response format for the set of results in the cognitive response, wherein the response format is determined based on confidence levels determined from social networking information associated with the identified user, and wherein the set of results is formatted to connote the confidence levels in the interface modality utilizing a vibration scheme on a device of the identified user, and wherein the social networking information includes one or more clusters matching a user to a relevant behavior pattern based, at least in part, on behaviors of one or more social media connections.

12. The computerized method of claim 11, wherein the set of information sources are selected from a group consisting of websites, search engines, structured data and unstructured data.

13. The computerized method of claim 11, wherein the interface modality is selected from a group consisting of: audio, audio/visual, tactile, textual, visual, secure, and private.

14. The computerized method of claim 11, wherein the response format is selected from a group consisting of: color designations, size, audio output levels, blinking patterns, privacy settings, security settings, and graphics.

* * * * *